United States Patent [19]

Morgan et al.

[11] Patent Number: 5,040,362
[45] Date of Patent: Aug. 20, 1991

[54] HARVESTING IMPLEMENT

[75] Inventors: Sam Morgan; Willard F. Morgan; Robert J. Morgan, all of Menlo, Kans.

[73] Assignee: Morgan Forage Harvesting, Menlo, Kans.

[21] Appl. No.: 541,884

[22] Filed: Jun. 20, 1990

[51] Int. Cl.⁵ .......................................... A01D 45/02
[52] U.S. Cl. .......................................... 56/93; 56/94; 56/98; 56/308
[58] Field of Search .................... 56/93, 53, 59, 66, 94, 56/98, 123, 75, 78, 82, 158, 307, 308, 310

[56] References Cited

U.S. PATENT DOCUMENTS

| | | | |
|---|---|---|---|
| 1,210,219 | 8/1940 | Sievers et al. | 56/119 |
| 2,836,026 | 5/1958 | Gray et al. | 56/119 |
| 2,949,716 | 8/1960 | Thomson | 56/15 |
| 3,365,867 | 1/1968 | Phillips | 56/53 |
| 3,462,927 | 8/1069 | Quick | 56/56 |
| 3,716,974 | 2/1973 | Wehde | 56/14.3 |
| 4,207,726 | 6/1980 | Lippl | 56/13.9 |
| 4,266,394 | 5/1981 | VanGinhoven et al. | 56/94 |
| 4,272,947 | 6/1981 | Mizzi | 56/63 |
| 4,296,593 | 10/1981 | Webb et al. | 56/98 |
| 4,539,799 | 9/1985 | Kalverkamp | 56/98 |
| 4,594,842 | 6/1986 | Wolters et al. | 56/94 |
| 4,771,592 | 9/1988 | Krone et al. | 56/59 |
| 4,926,623 | 5/1990 | Fiener | 56/94 |

Primary Examiner—Terry L. Melius
Attorney, Agent, or Firm—Litman, McMahon & Brown

[57] ABSTRACT

An implement for attachment onto a harvesting vehicle, particularly adapted for harvesting stalk-type crops independent of the direction of and distance between the rows of crops to be harvested, includes a frame, a plurality of directing fingers fixedly attached to the frame and extending generally forwardly therefrom and a generally transverse cutter bar mounted horizontally along a front portion of the frame. A pair of triangular shaped members are mounted on the frame behind the cutting bar and have guide chains slidingly mounted thereon. The guide chains surround each member and are adapted to revolve therearound. A plurality of gathering lugs are fixedly attached to each guide chain and extend outwardly from each member. Crops are directed to the cutter bar and gathering lugs by the directing fingers and are transferred onto the harvesting vehicle by the gathering lugs as the guide chains revolve about each triangular member.

18 Claims, 6 Drawing Sheets

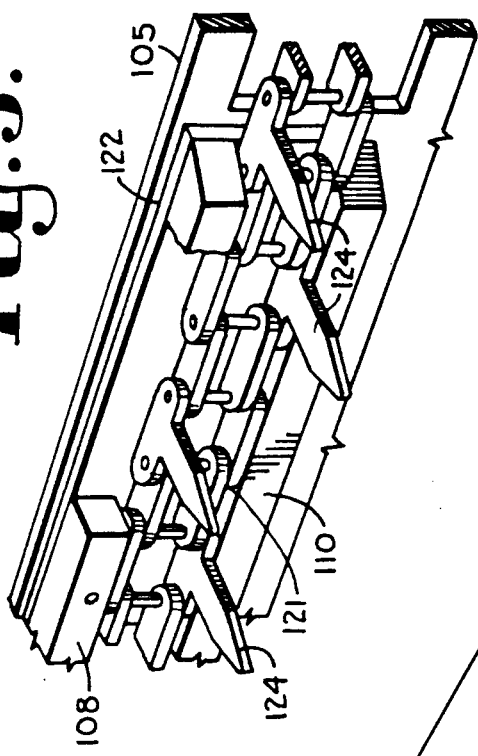
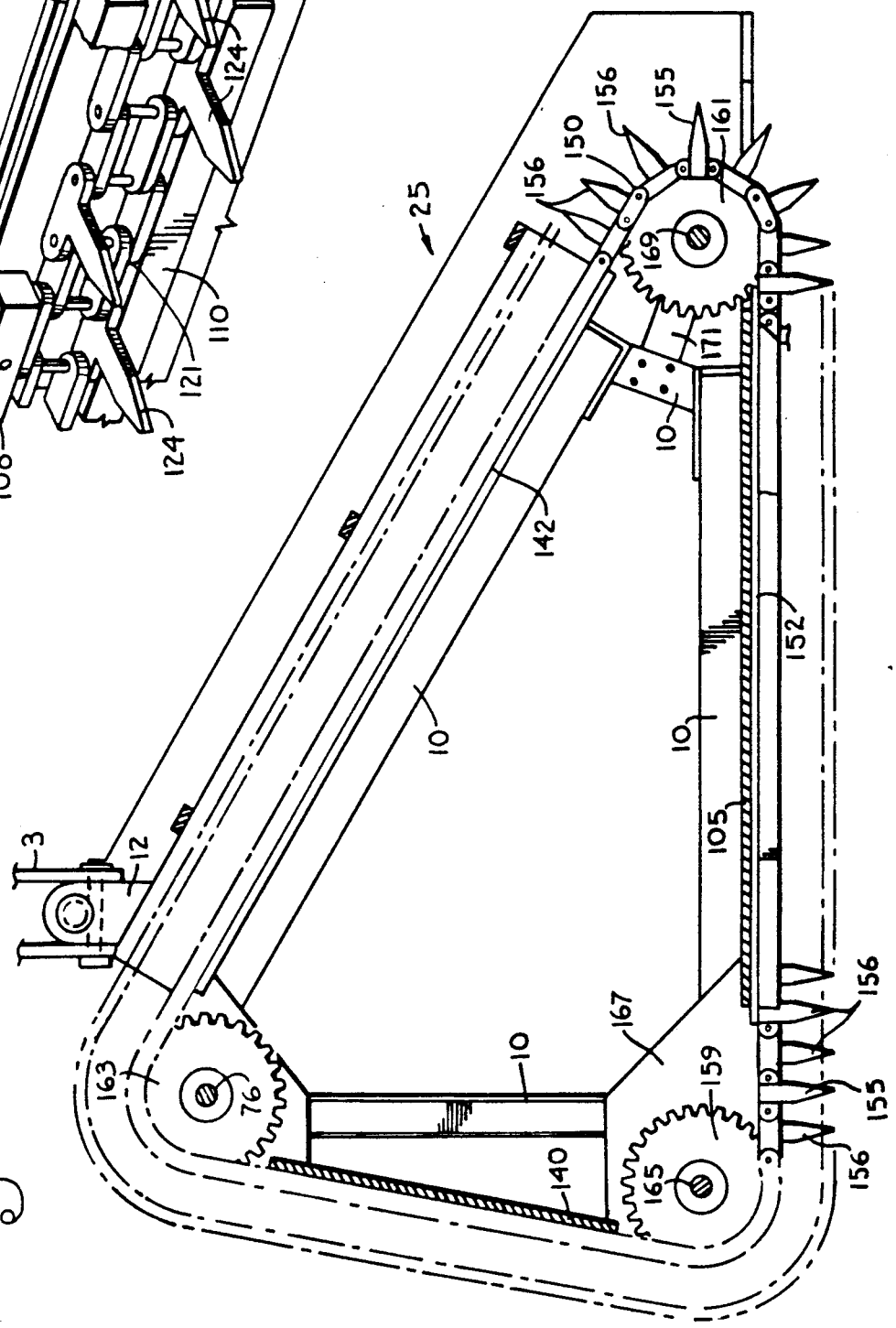

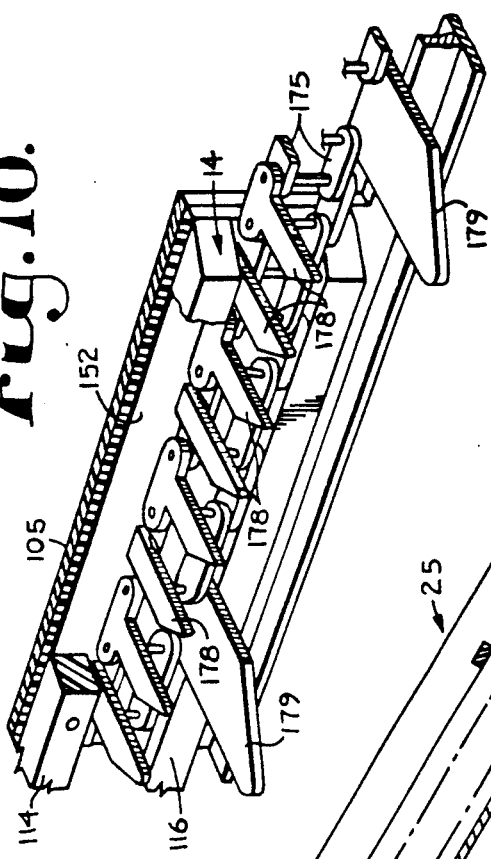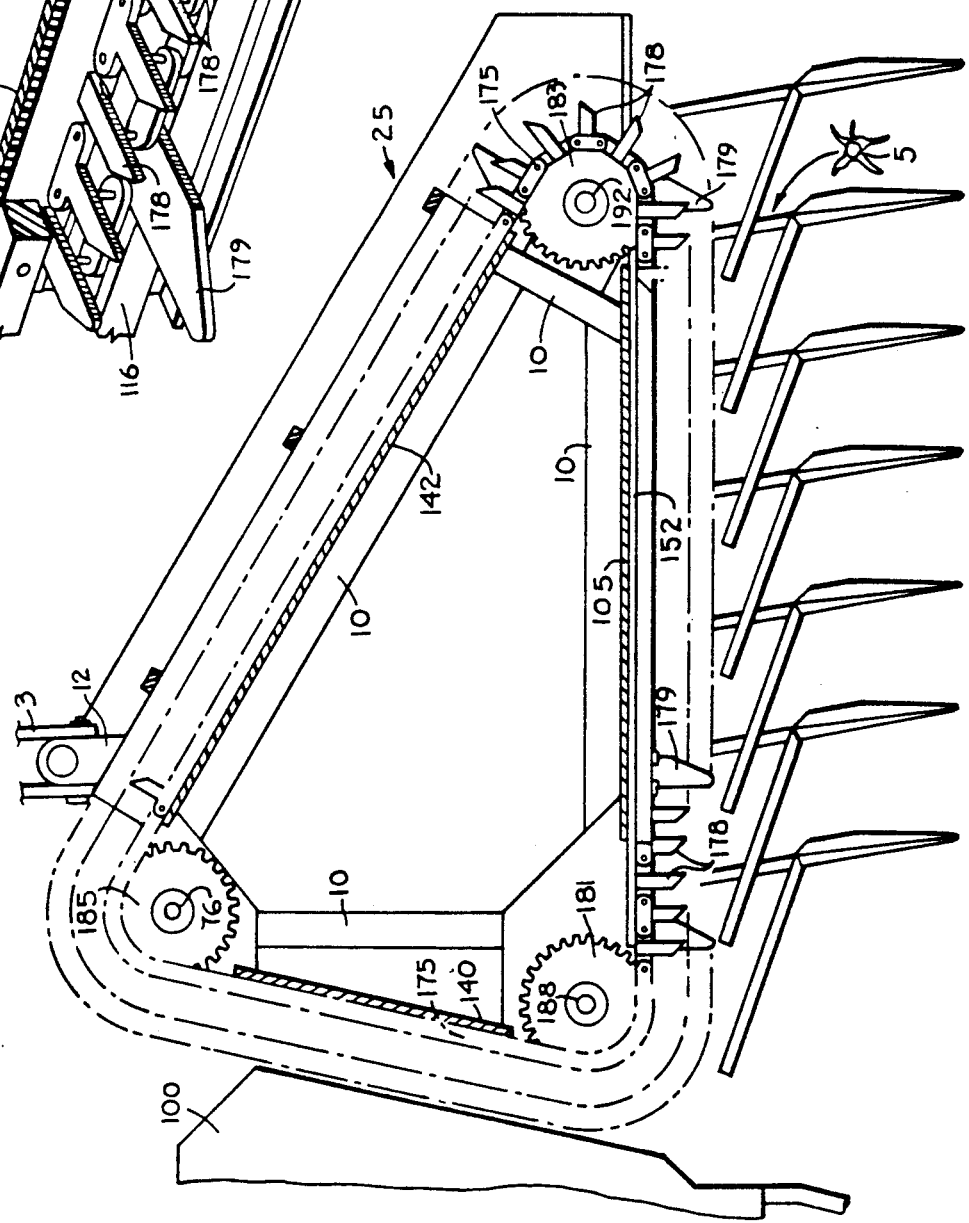

5,040,362

HARVESTING IMPLEMENT

BACKGROUND OF THE INVENTION

The present invention relates generally to apparatus for harvesting crops and, more particularly, to an improved implement for attachment to a vehicle for harvesting upright, stalk-type crops.

Various implements for harvesting stalk-type crops have included counter-rotating, crop-gathering elements that rotate about generally vertical axes and grasp the crop stalks in upright positions and draw them between the rotating elements. Such crop-gathering elements minimize crop loss because the stalks are handled less roughly and, therefore, both heads and stalks are more likely to reach the harvesting vehicle undamaged.

Many of such rotating, crop-gathering implements are row-dependent. An operator must carefully and accurately guide a harvesting vehicle along a row of crops in order to adequately draw in the crops between the rotating elements. Thus, crop loss can occur when using such crop-gathering implements when crops are not planted uniformly and when broadcast crops are harvested.

The problems of harvesting nonuniformly-planted crops have been addressed by devices that use circular cutting blades and cylindrical gathering elements which rotate about generally vertical axes. With such devices, the crops are first directed toward the rotating cutting and gathering components by guiding fingers extending forwardly from the device. As the crops come in contact with the rotating element, they are cut and then held against a rotating cylinder by members projecting from the cylinder.

Such devices can cut and draw stalk-type crops into a harvesting vehicle, however, circular cutting blades can be more expensive to build than horizontal cutter bars. Also, the width of the cutting sweep of such a device is limited. To cut a wider sweep, the diameter of the circular cutting blade and cylindrical crop-gathering element must be increased, resulting in a heavier device which requires additional power to rotate. Larger diameter devices also result in greater clearance requirements and are more expensive to build.

SUMMARY OF THE INVENTION

A harvesting implement of the invention disclosed in this application includes a frame adapted to pivotally attach to a front of a harvesting vehicle. A generally transverse cutter bar is mounted horizontally along a front portion of the frame. A plurality of directing fingers are fixedly attached to a base of the frame and extend generally forwardly and upwardly from the cutter bar. A portion of each directing finger also generally slants inwardly towards a central section of the implement.

A pair of spaced, triangular-shaped members are mounted on the frame behind the cutter bar, each having three generally horizontal guide chains slidingly mounted thereon. The first guide chain is located near a top of each triangular member and the second and third guide chains near the base of each member. The guide chains surround each member and are adapted to revolve therearound, with the guide chains of one triangular member revolving in a direction counter to the guide chains of the other member. A plurality of spaced, gathering lugs are fixedly attached to each guide chain and extend outwardly from each member.

Crops are directed to the cutter bar by the directing fingers and are steered in a direction by the fingers coinciding with the direction of travel of the guide chains. As a lower portion of each crop stalk is cut by a blade of the cutter bar, the stalk comes in contact with a triangular member and is held between the directing fingers and the triangular member while being transported along a side of the member by the guide chains and gathering lugs as the guide chains revolve about each triangular member. The lugs push and draw the crop stalks toward the space inbetween the triangular members and then rearward toward the harvesting vehicle.

OBJECTS OF THE INVENTION

Therefore, the objects of the present invention are: to provide an improved harvesting implement and, in particular, an implement adapted for harvesting stalk-type crops independent of the direction of, and/or distance between, the rows of crops to be harvested; to provide such a harvesting implement that includes fixed members having guiding chains with crop-gathering lugs mounted thereon, with the guiding chains revolving around the members and gathering upright crop stalks onto the implement; to further provide such an implement that includes crop-directing fingers for steering crop stalks toward the guiding chains; to provide such an implement that utilizes available, inexpensive crop-cutting elements; to further provide an implement that is easily and inexpensively adapted to perform greater cutting sweeps without impairing ground clearance; to provide such an implement that is made from parts readily available on the market; to provide such an implement that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an enlarged and fragmentary perspective view of the implement.

FIG. 6 is an enlarged and fragmentary cross-sectional view of the implement shown along 6—6 of FIG. 3.

FIG. 9 is and enlarged and fragmentary cross-sectional view taken along 9—9 of FIG. 3.

FIG. 10 is an enlarged and fragmentary perspective view of the implement.

DETAILED DESCRIPTION OF THE INVENTION

Figure 1:
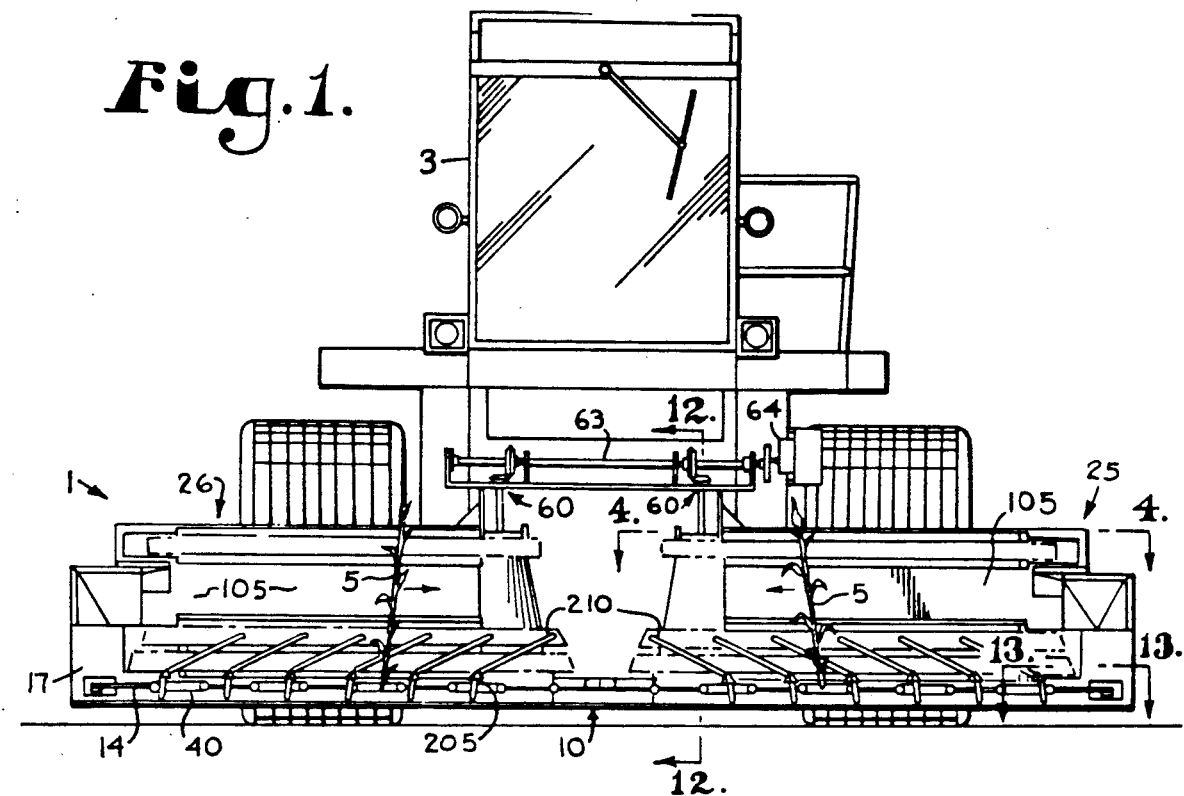
FIG. 1 is a front elevational view of a harvesting implement according to the present invention shown with a harvesting vehicle.
Figure 2:
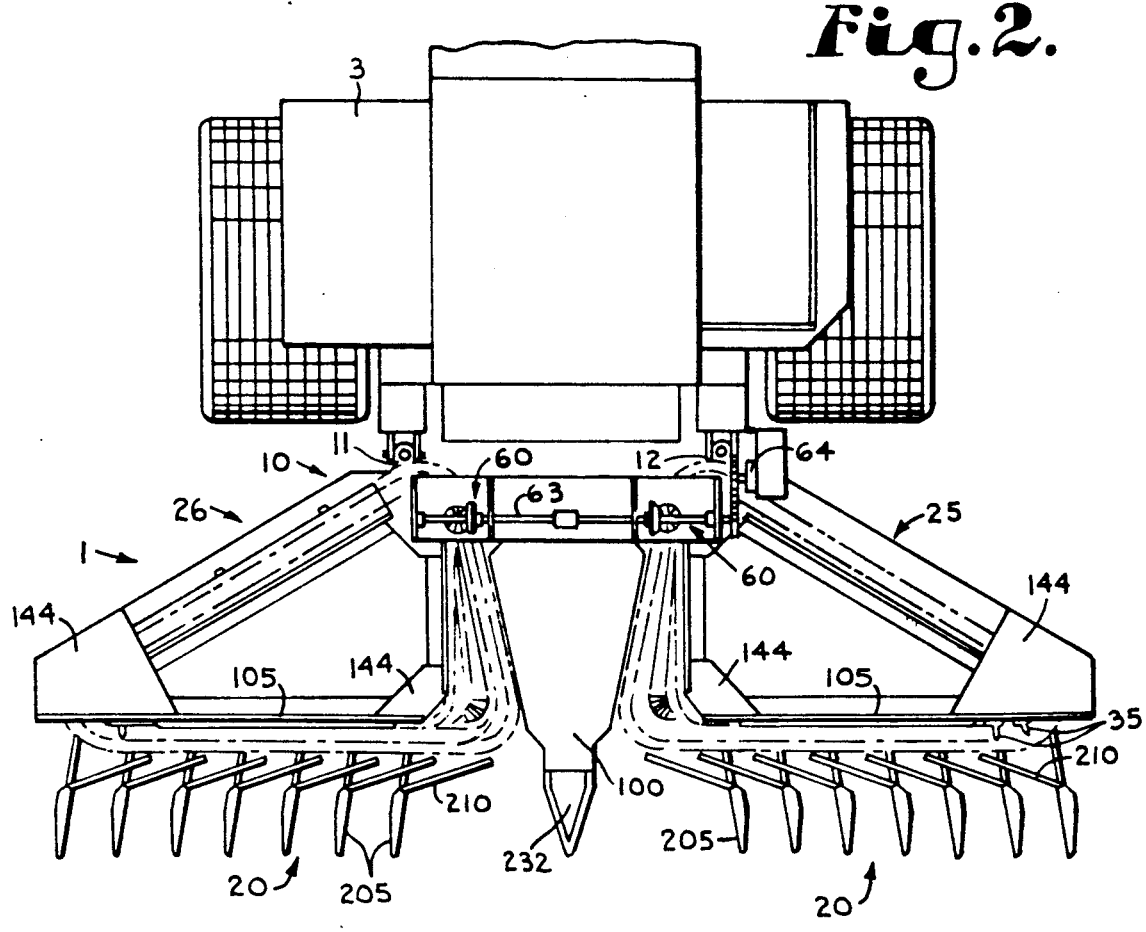
FIG. 2 is a top plan view of the implement and vehicle.
Figure 3:
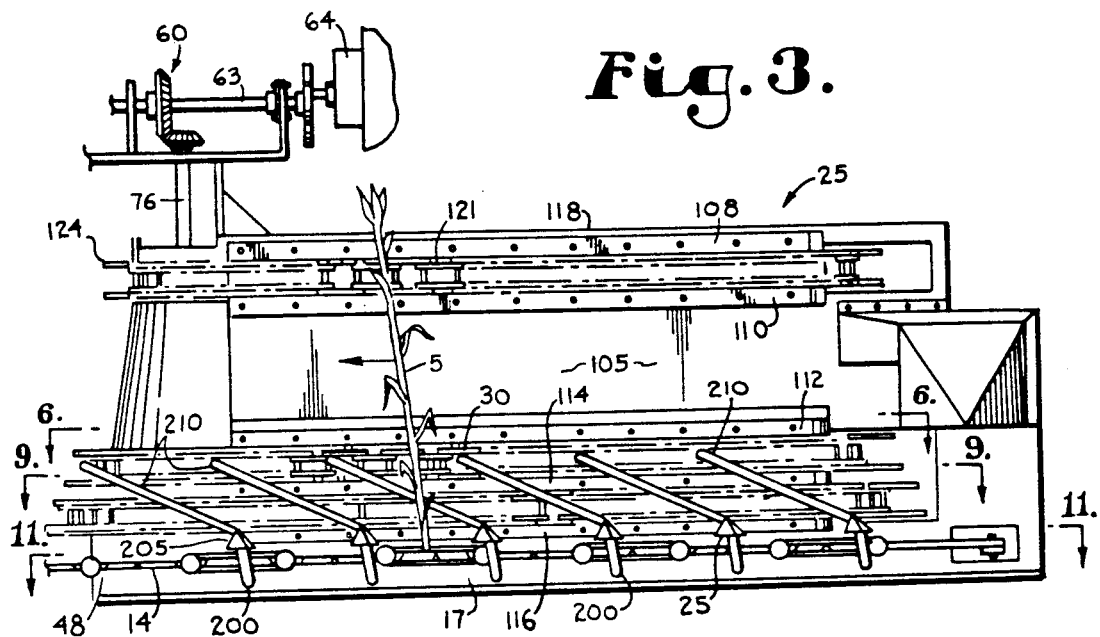
FIG. 3 is an enlarged and fragmentary front elevational view of the implement.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIGS. 1 through 13 generally illustrate a harvesting apparatus or implement in accordance with the present invention (generally designated by the reference numeral 1) adapted to attach to a self-propelled harvesting and threshing machine such as illustrated by harvesting vehicle 3 for cutting and gathering upright stalk-type crops 5. The implement 1 generally includes a frame 10 adapted to pivotally attach to harvesting vehicle 3 at arms 11 and 12; cutting means illustrated by a generally transversely disposed, horizontal cutter bar assembly 14 slidingly mounted on a front portion 17 of frame 10; crop directing means, such as illustrated by directing fingers 20, mounted on the base 23 of frame 10; and two generally triangular shaped members 25 and 26 mounted on frame 10, each member 25 and 26 having crop-guiding means, such as illustrated by guide chains generally represented by the reference numeral 30, slidingly mounted thereon with generally pointed crop-gathering lugs 35 spaced along each chain 30 and extending outwardly from triangular members 25 and 26. The guard chains 30 are adapted to revolve or travel about a periphery of members 25 and 26. In this application, the term "revolve" shall mean to travel or otherwise move around an item such as triangular members 25 and 26 and is not limited to a circular or eliptical path, but may include, for example, triangular, square, rectangular, or other paths. The frame 10, triangular-shaped members 25 and 26, cutter bar assembly 14, directing fingers 20, guide chains 30 and lugs 35 are made from metal or other rigid material.

The cutter bar assembly 14 shown in FIGS. 1, 3, 11, 12 and 13 is slidingly mounted upon and extends transversely along the front 17 of frame 10. The assembly 14 includes a reciprocal sickle or cutting blade 40 of conventional design and has a plurality of teeth or blades 42 attached to an elongate cutting or cutter bar 44. The cutting bar 44 is supported between a lower portion 48 of the front 17 of frame 10 and support members 50 fixedly attached to an upper portion 52 of front 17 and a lower portion 53 of front 17. The support members 50 include pairs of pointed guides 55 extending forwardly from front 17 adapted for capturing crop stalks 5 between blades 42 and the pointed guides 55 for cutting of the stalks 5 by the blades 42.

Figure 12:
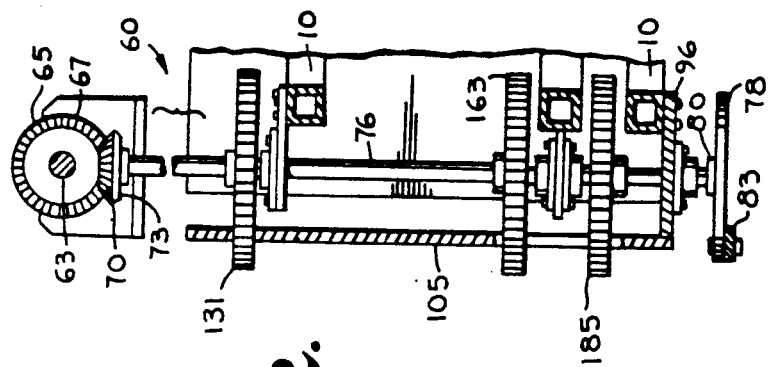
FIG. 12 is an enlarged and fragmentary cross-sectional view taken along 12—12 of FIG. 1.
Figure 11:
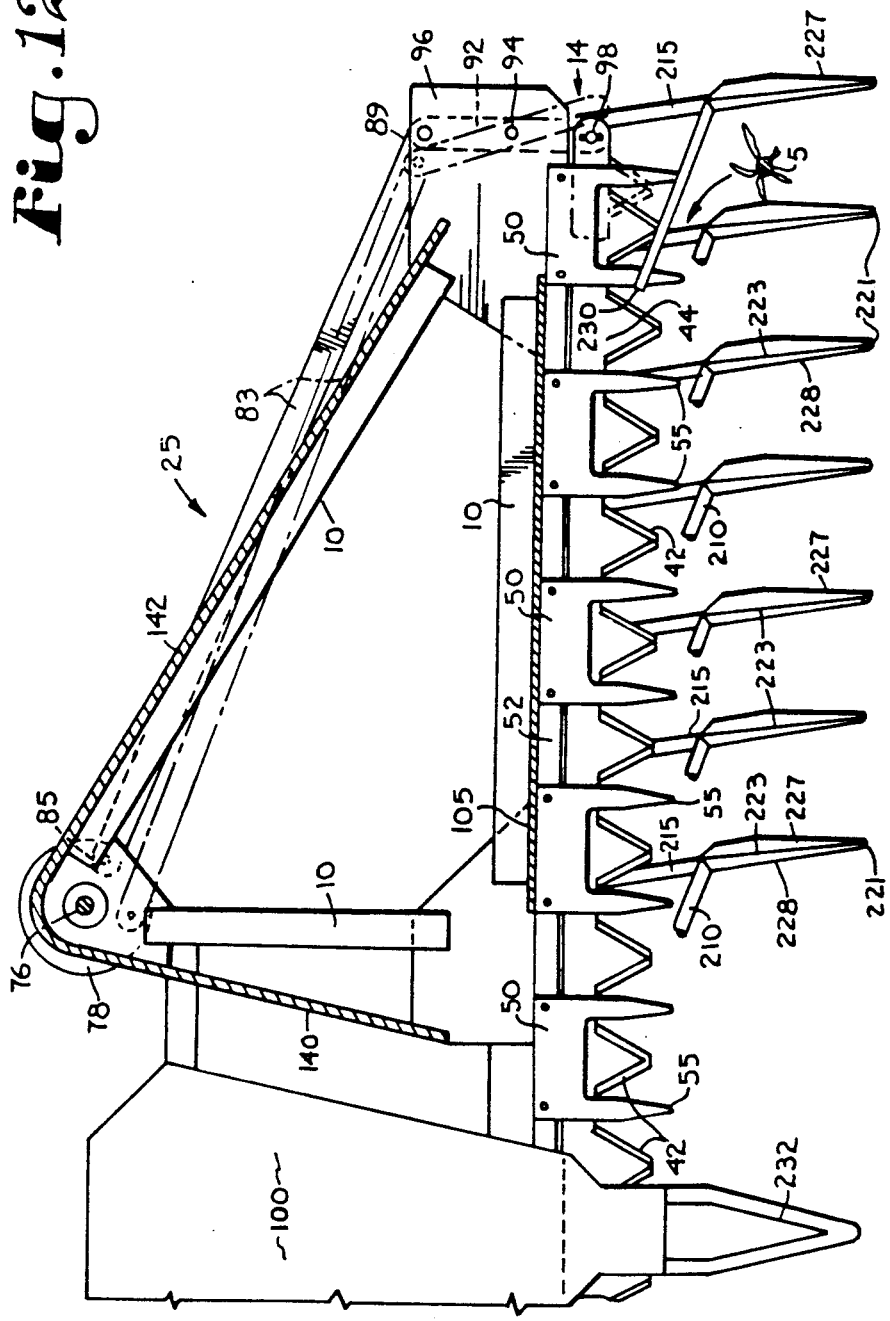
FIG. 11 is and enlarged and fragmentary cross-sectional view taken along 11—11 of FIG. 3 with a reciprocating cutter bar drive assembly shown in phantom lines.

Means for reciprocating the cutting blade 40 is illustrated by a pair of drive assemblies 60, as shown in FIGS. 1 and 12, and includes a horizontal drive shaft 63 located on the harvesting vehicle 4 driven by the main axle 64 powered by an engine (not shown) mounted on the vehicle 4. Each drive assembly 60 corresponds with a triangular member 25 and includes a gear 65 fixedly mounted on the drive shaft 63 having teeth 67 that engage teeth 70 of a gear 73 fixedly mounted on a generally vertical shaft 76. A cam plate 78 is fixedly attached to the base 80 of the vertical shaft 76 at the center thereof. A bar 83 is pivotally connected to the cam plate 78 at a first end 85 and pivotally connected at a second end 89 to a rocking bar 92. The rocking bar 92 is pivotally mounted at point 94 to a bottom surface of a support brace 96 fixedly attached to frame 10 near the cutting blade 40. The rocking bar 92 is also pivotally connected to cutting blade 40 at an end 98. The pivot point 94 is located such that when the cam plate 78 rotates about the shaft 76, bar 83 reciprocates, causing rocking bar 92 to reciprocate which, in turn, causes the cutting blade 40 to reciprocate to achieve a cutting action. It is foreseen that other types of reciprocating mechanisms conventionally employed on combines may also be used to reciprocate the cutting blade 40.

Generally, triangular shaped members 25 and 26 are fixedly mounted to frame 10 and are separated by a generally triangular platform 100 also fixedly attached to frame 10. Triangular-shaped member 25 is a mirror image of member 26. Therefore, all features subsequently described with regard to member 25 in this application also apply to member 26. It is foreseen that members 25 and 26 may be other than triangular in shape.

Member 25 includes a forward vertical plate 105 mounted behind cutting blade 40 on frame 10 and is aligned generally parallel to cutting blade 40. Generally, horizontal, elongate, spaced, chain support guards 108, 110, 112, 114 and 116 are fixedly attached to plate 105, with guards 108 and 110 located near top edge 118 of plate 105, and guards 112, 114 and 116 located near the cutting bar 44 with guard 114 located above guard 116 and guard 112 located above guard 114. The space between guards 108 and 110 and between 112, 114 and 116 is adapted to be wide enough for a guide chains 30 to pass therebetween. Chain support guards 108, 110, 112, 114 and 116 are made from nylon or other rigid material that is also smooth, providing a slick surface for crops to slide therealong.

Figure 4:
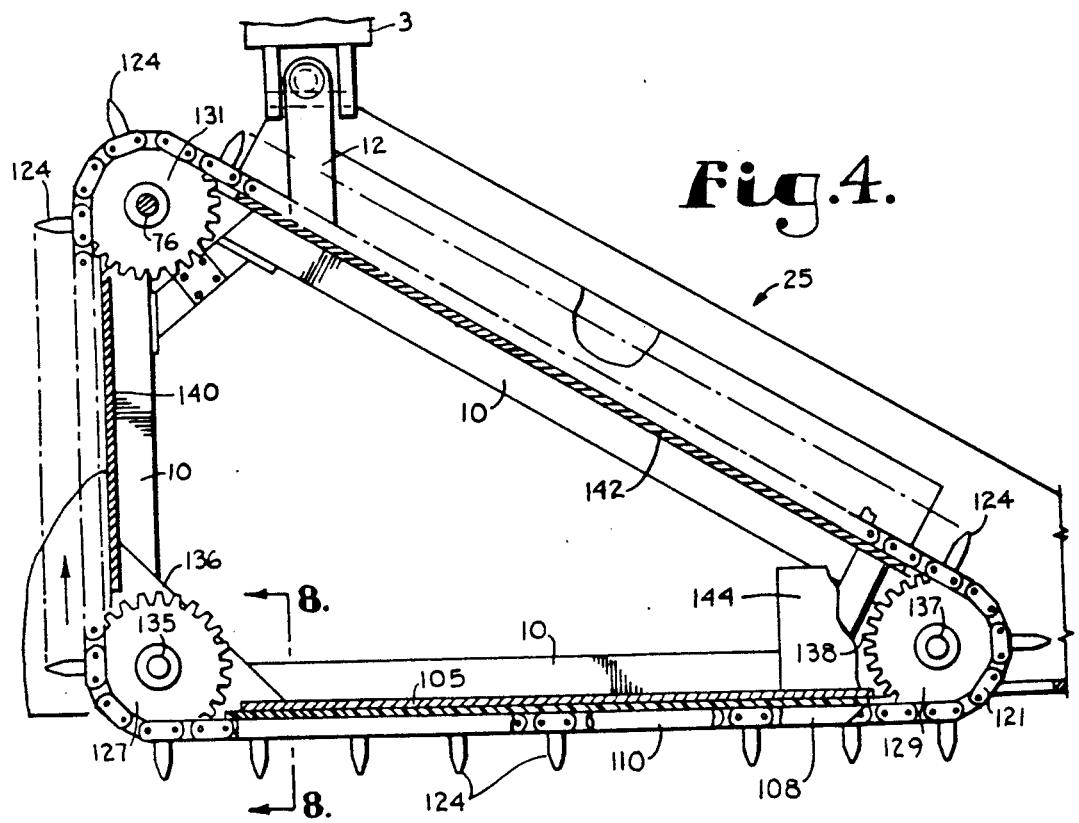
FIG. 4 is an enlarged and fragmentary cross-sectional view taken along 4—4 of FIG. 1.

A top portion of member 25 and chain support guards 108 and 110 are shown in greater detail in FIGS. 4 and 5. A guide chain 121 is slidingly mounted between guards 108 and 110 and is adjacent to a backing plate 122 fixedly attached to vertical plate 105 and made from nylon or other smooth material. Intermittently-spaced crop-gathering means, as illustrated by gathering lugs 124, are fixedly attached to certain links of chain 121 and are located at both the top and bottom of the chain 121. The lugs extend outwardly from the vertical plate 105. The spacing of lugs 124 is adapted for crop tops that are wider or have a greater diameter than crop stalks.

Member 25 also includes sprockets 127, 129 and drive sprocket 131 located at the corners thereof. Sprocket 127 is located on and slidingly connected to a generally vertical shaft 135 fixedly mounted on support 136 fixedly attached to frame 10, and sprocket 129 is located and slidingly connected to a generally vertical shaft 137 fixedly mounted on support 138 fixedly attached to frame 10. Drive sprocket 131 is located and fixedly connected to shaft 76.

Vertical plate 105 generally extends between sprockets 127 and 129. A vertical support plate 140 fixedly mounted on frame 10 generally extends between sprockets 127 and 131 and a vertical support plate 142 fixedly mounted on frame 10 generally extends between sprockets 129 and 131. Chain 121 surrounds or extends around a periphery of member 25 and engages sprockets 127, 129 and 131. When shaft 76 rotates, sprocket 131 rotates and causes chain 121 to revolve about member 25, causing sprockets 127 and 129 to rotate. Guard members (not shown) mounted on plates 140 and 142 provide sliding support for chain 121 while circling or revolving around member 25 and approximately maintains chain 121 on a single, generally horizontal plane. Top guard members 144 mounted on plates 105, 140 and 142 cover and protect sprockets 135 and 137.

Figure 7:
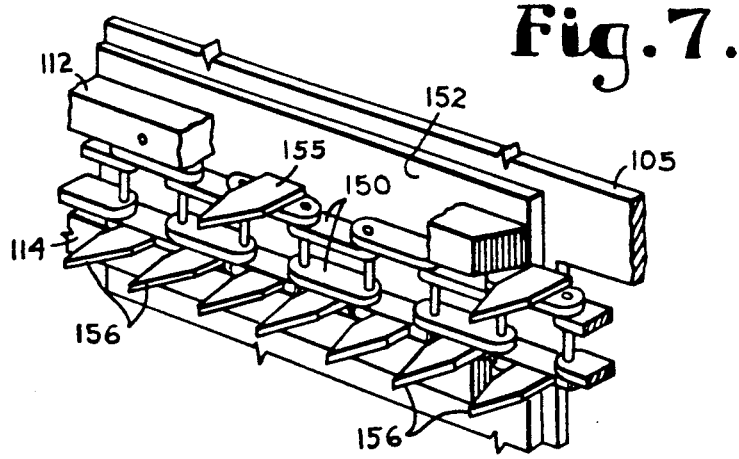
FIG. 7 is an enlarged and fragmentary perspective view of the implement.

A mid-portion of member 25 and chain support guards 112 and 114 are shown in greater detail in FIGS. 6 and 7. A guide chain 150 is slidingly mounted between guards 112 and 114 and is adjacent to a backing plate 152 fixedly attached to vertical plate 105 and made from nylon or other smooth material. Intermittently-spaced crop-gathering means, as illustrated by gathering lugs 155 and 156, are fixedly attached to certain links of chain 150, with gathering lugs 155 attached to a top surface of chain 150 and lugs 156 attached to a bottom surface of chain 150. Lugs 156 are spaced close together, while lugs 155 are spaced further apart to accomodate crop tops and leaves that are wider than crop stalks. Lugs 156 extend outwardly from member 25, slightly further than lugs 155.

Guide chain 150 extends around the periphery of member 25 and engages sprockets 159, 161 and drive sprocket 163 located at the corners of member 25. Sprocket 159 is located on and slidingly connected to a generally vertical shaft 165 fixedly mounted on support 167 attached to frame 10, and sprocket 161 is located on, and slidingly connected to, a generally vertical shaft 169 fixedly mounted on support 171 attached to frame 10. Sprocket 163 is located on and fixedly connected to shaft 76. When shaft 76 rotates, sprocket 163 rotates and causes chain 150 to revolve about member 25, causing sprockets 159 and 161 to rotate. Guard members (not shown) mounted on plates 140 and 142 provide sliding support for chain 150, while circling or revolving around member 25, and approximately maintains chain 150 on a single, generally horizontal plane.

Figure 13:
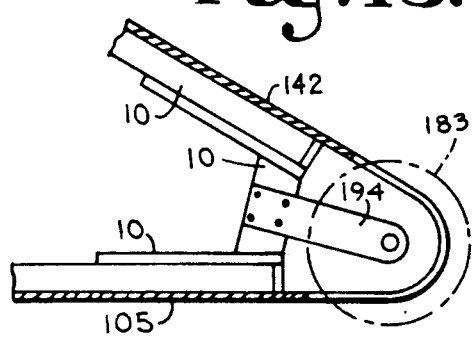
FIG. 13 is an enlarged and fragmentary cross-sectional view taken along 13—13 of FIG. 1.
Figure 8:
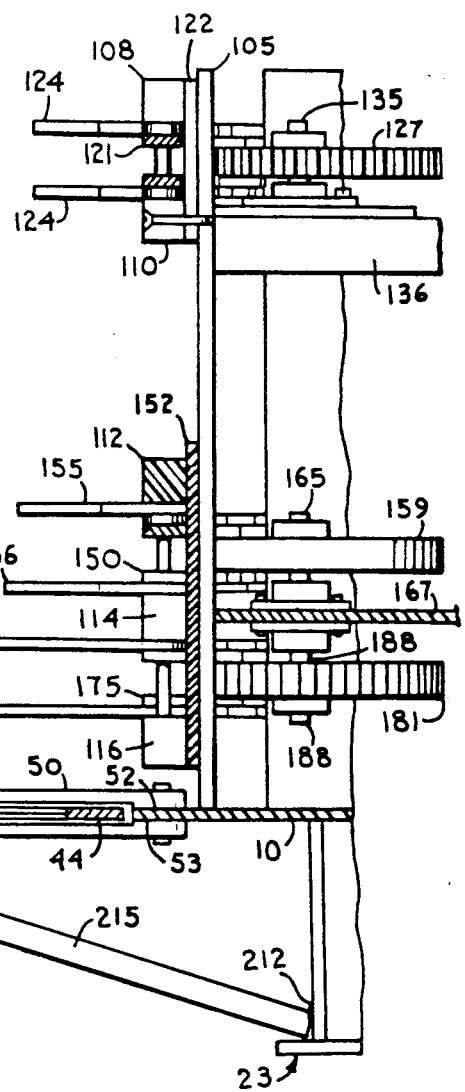
FIG. 8 is an enlarged and fragmentary cross-sectional view taken along 8—8 of FIG. 4.

A lower portion of member 25 and chain support guards 114 and 116 are shown in greater detail in FIGS. 9, 10 and 13. A guide chain 175 is slidingly mounted between guards 114 and 116 and is adjacent to backing plate 152. Intermittently-spaced crop-gathering means, as illustrated by gathering lugs 178 and 179, are fixedly attached to certain links of chain 175 with gathering lugs 178 attached to a top surface of chain 175 and lugs 179 attached to a bottom surface of chain 175. Lugs 178 and 179 extend outward from member 25 further than lugs 156. Lugs 178 are spaced closely together and adapted to capture and transfer plant stalks along plate 105. Lugs 179 are larger and heavier than lugs 178 and extend further from member 25. Lugs 179 are adapted to capture and push broken pieces of crop along the top of the cutter bar 44.

Guide chain 175 extends around the perifery of member 25 and engages sprockets 181 and 183 and drive sprocket 185 located at the corners of member 25. Sprocket 181 is located on and slidingly connected to a generally vertical shaft 188 fixedly mounted on support 167 attached to frame 10, and sprocket 183 is located on and slidingly connected to a generally vertical shaft 192 fixedly mounted on support 194 attached to frame 10. Sprocket 185 is located on and fixedly connected to shaft 76. When shaft 76 rotates, sprocket 185 rotates and causes chain 175 to revolve about member 25, causing sprockets 181 and 183 to rotate. Guard members (not shown) mounted on plates 140 and 142 provide sliding support for chain 175, while revolving around member 25, and approximately maintains chain 175 on a single, generally horizontal plane.

Crop-directing fingers 20 are fixedly mounted on base 23 of frame 10 below and behind the cutting bar 44. Each crop finger 20 includes a first section 200, a second section 205 and a third section 210. The first section 200 is fixedly connected to a front 212 of base 23 and extends forwardly and upwardly therefrom. Section 200 includes a generally straight, cylindrical bar portion 215 that extends between front 212 and to a bend 217 located forward and slightly below a forward end 218 of support members 50. At bend 217, a second straight, cylindrical bar portion 219 of section 200 angles upwardly and extends to a point 221 that is forward and upward from the forward end 218 of support members 50.

At point 221, section 200 fixedly attaches to section 205. Section 205 is generally triangular in shape and extending rearwardly, horizontally back towards members 25 and 26. Section 205 includes a fold 223 extending along a line from point 221 to a rear edge 225, with side edges 227 and 228 located below fold 223.

At rear edge 225, section 205 is fixedly attached to section 210. Section 210 is generally straight and cylindrical, and extends upwardly and rearwardly from section 205. Each crop directing finger 20 that extends forwardly in front of member 25 has a section 210 that angles in the same direction as the direction of revolution of guide chains about member 25. Each crop directing finger 20 that extends forwardly in front of member 26 has a section 210 that angles in the same direction as the direction of revolution of guide chains about member 26, which is counter to the revolution direction of guide chains about member 25. Each section 210 extends near to member 25 or 26 and has a length adapted to support crops as they are transported along the front of members 25 and 26. Each end 230 of section 210 extends near to edge 225 of section 205 of the nearest directing finger 20, providing almost continuous support for crops being transported. A large triangular finger 232 extends forwardly from and is fixedly attached to platform 100.

Implement 1 may be constructed for various crop-cutting sweeps with only minor increases in implement weight and ground clearance. Members 25 and 26 may be adapted to include longer, forward, vertical plates 105 to increase the cutting sweep of implement 1, increasing the length of vertical support plates 140 and 142, but decreasing the overall depth of the implement, resulting in adequate or possibly improved ground clearance.

In operation, horizontal drive shaft 63 is engaged by an operator located in vehicle 3. Drive shaft 63 engages vertical drive shaft 75, causing cam plate 78 and sprockets 131, 163 and 185 to rotate. The rotation of cam plate 78 activates the cutter bar assembly 14. Rotation of sprockets 131, 163 and 185, respectively, causes guide chains 121, 150 and 175 to revolve about member 25 in a clockwise direction when viewed from a position in front of implement 1, and causes chains 121, 150 and 175 to revolve about member 26 in a counterclockwise direction when viewed from a position in front of implement 1. As the harvesting vehicle 3 drives forwardly through a field of crops 5, the first and second sections 200 and 205 of crop-direction fingers 20 steer or guide crops directly onto the forward plate 105 of triangular members 25 and 26 and the base of the crop stalks are severed by the blades 42 of the cutting bar 44. The crops then engage guide chains 30 and gathering lugs 35 and are drawn and pushed along between section 210 of the guide fingers 20 and the front plate 105 toward the platform 100 located between members 25 and 26. Guide chains 30 and lugs 35 continue to draw and push the crops 5 rearwardly toward the harvesting vehicle 3 along the platform 100 until the crops reach the vehicle 3.

It is to be understood that while certain forms of the present invention have been illustrated and described herein, it is not to be limited to the specific forms or arrangement of parts described and shown.

What is claimed and desired to be secured by Letters Patent is as follows:

1. In combination with an implement for use in harvesting stalk-type crops having a frame and a generally transversely disposed horizontal cutter bar extending along a front of the implement, the improvement comprising:
   (a) crop-directing means fixedly attached to the frame and extending generally forwardly from the cutter bar;
   (b) a member fixedly attached to said frame located behind said crop-directing means;
   (c) guide means slidingly mounted on and surrounding said member and adapted to revolve therearound in a selected direction;
   (d) means for revolving said guide means about said member; and
   (e) said crop directing means including means for tilting said crops in a direction from bottom-to-top corresponding to said selected direction prior to cutting of said crops.

2. The implement according to claim 1 wherein said cropdirecting means includes:
   (a) a plurality of directing fingers each having a first section fixedly attached to a second section; said first section fixedly attached to the frame below the cutter bar and extending upwardly and forwardly therefrom; said second section extendly upwardly and rearwardly from said first section and angled in a direction coinciding with the direction said guide means revolve about said member.

3. The implement according to claim 1 wherein said guide means include:
   (a) first and second parallel and generally horizontal guide supports fixeldy attached to said member;
   (b) a chain surrounding said member slidingly mounted between said first and second guide supports and supported thereby; and
   (c) a plurality of gathering lugs fixedly attached to said chain and extending outwardly from said member.

4. The implement according to claim 1 wherein:
   (a) said member includes a front side and is generally triangular in shape; said front side is parallel with the cutter bar.

5. The implement according to claim 1 wherein said member is a first member, said guide means is a first guide means and said means for revolving said guide means is a first means for revolving said guide means and including:
   (a) a second member fixedly attached to said frame and spaced from said first member;
   (b) a second guide means surrounding said second member and adapted to revolve therearound; and
   (c) second means for revolving said second guide means about said second member; said second guide means adapted to revolve in a direction counter said first guide means; said first and second guide means adapted to guide crops between said first member and said second member.

6. An apparatus for harvesting stalk-type crops comprising:
   (a) a frame having a front portion;
   (b) crop-directing means mounted on said frame and extending forwardly from said front portion;
   (c) cutting means connected to said front portion;
   (d) a member mounted on said frame behind said cutting means;
   (e) guide means surrounding said member and adapted to revolve therearound in a selected direction;
   (f) means for revolving said guide means about said member; and
   (g) said crop directing means including means for tilting said crops in a direction from bottom-to-top corresponding to said selected direction prior to cutting of said crops.

7. The apparatus according to claim 6 wherein said crop directing means includes:
   (a) a plurality of directing fingers each having a first section fixedly attached to a second section; said first section fixedly attached to the frame below said cutting means and extending upwardly and forwardly therefrom; said second section extending upwardly and rearwardly from said first section and angled in a direction coinciding with the direction said guide means revolves about said member.

8. The apparatus according to claim 5 wherein said guide means include:
   (a) first and second parallel and generally horizontal guide supports fixeldy attached to said member;
   (b) a chain surrounding said member slidingly mounted between said first and second guide supports and supported thereby; and
   (c) a plurality of gathering lugs fixedly attached to said chain and extending outwardly from said member.

9. The apparatus according to claim 6 wherein:
   (a) said member includes a front side and is triangular in shape; said front side is parallel with said cutting means.

10. The apparatus according to claim 6 wherein:
    (a) said cutting means is a horizontal cutter bar.

11. The apparatus according to claim 6 wherein said member is a first member, said guide means is a first guide means and said means for revolving said guide means is a first means for revolving said first guide means and including:

(a) a second member fixedly attached to said frame and spaced from said first member;

(b) a second guide means surrounding said second member and adapted to revolve therearound; and (c) second means for revolving said second guide means about said second member; said second guide means adapted to revolve in a direction counter said first guide means; said first and second guide means adapted to guide crops between said first member and said second member.

12. An apparatus for harvesting stalk-type crops comprising:

(a) a frame having a front portion and a base;

(b) a plurality of crop-directing fingers mounted on said base and extending forwardly from said front portion;

(c) a generally transversely disposed horizontal cutter bar slidingly connected to said front portion;

(d) first and second spaced members mounted on said frame behind said cutter bar; said first and second members each having a top and a bottom;

(e) a platform mounted on said frame and located between said first and second members;

(f) first and second guide means; said first guide means slidingly connected to and surrounding said first member and adapted to revolve therearound; said second guide means slidingly connected to and surrounding said member and adapted to revolve therearound;

(g) means for respectively revolving said first and second guide means about said first and second members; and (h) each of said crop-directing fingers including:

(1) a first section having an end; said first section fixedly attached to said base at a location below said cutter bar and extending upwardly and forwardly therefrom at said end; and (2) a second section fixedly attached to said end of said first section and extending rearwardly from said end towards said guide means and angled in a direction toward said platform.

13. The apparatus according to claim 12 wherein:

(a) said first and second members have first and second front sides respectively; and (b) said first and second members are triangular in shape with said first and second front sides parallel with said cutter bar.

14. An appartus according to claim 12 wherein means for revolving said first and second guide means includes:

(a) a first sprocket assembly engaging said first guide means and located near said first member;

(b) a second sprocket assembly engaging said second guide means and located near said second member; and (c) a drive shaft connected to said first and second sprocket assemblies.

15. An implement for harvesting stalk-type crops adapted to attach to a harvesting vehicle comprising:

(a) a frame having a front portion and a base; said frame adapted to pivotally attach to the harvesting vehicle;

(b) a generally transversely disposed horizontal cutter bar slidingly connected to said front portion;

(c) first and second spaced, triangularly-shaped members, each having a front side, a top and a bottom; said first and second members mounted on said frame behind said cutter bar with said front sides parallel to said cutter bar;

(d) a platform mounted on said frame and located between said first and second members;

(e) a plurality of crop-directing fingers mounted on said base and extending generally forwardly from said front portion along the length of said cutter bar; each of said fingers include:

(1) a first section having a first end; said first section attached to said base at a location below said cutter bar and extending upwardly and forwardly therefrom at said end;

(2) a triangular-shaped section having a rear edge; said triangular-shaped section fixedly attached to said end of said first section and extending rearwardly from said end; and (3) a second section fixedly attached to said rear edge of said triangular shaped section; said second section slanted at an angle directed toward said platform; and (f) first guide means surrounding said first member; said first guide means including:

(1) first and second parallel and generally horizontal guide supports fixedly attached to said first member and located near said top;

(2) a first guide chain surrounding said first member and slidingly mounted between said first and second guide supports and supported thereby;

(3) a plurality of spaced, first gathering lugs fixedly attached to said first chain and extending outwardly from said first member;

(4) third and fourth parallel and generally horizontal guide supports fixedly attached to said first member and located near said bottom;

(5) a second guide chain surrounding said first member and slidingly mounted between said third and fourth guide supports and supported thereby;

(6) a plurality of spaced, second gathering lugs fixedly attached to said second chain and extending outwardly from said first member at a distance greater than said first gathering lugs;

(7) a fifth horizontal guide support fixedly attached to said first member parallel to said fourth guide support and located therebelow;

(8) a third guide chain surrounding said first member and slidingly mounted between said fourth and fifth guide supports and supported thereby;

(9) a plurality of spaced, third gathering lugs fixedly attached to said third chain and extending outwardly from said first member at a distance greater than said second gathering lugs;

(10) a first sprocket assembly engaging said first guide means and located near said first member; and

(11) a drive shaft connected to said first sprocket assemblies.

16. In combination with an implement for use in harvesting stalk-type crops having a frame and a generally transversely disposed horizontal cutter bar extending along a front of the implement, the improvement comprising:

(a) crop-directing means fixeldy attached to the frame and extending generally forwardly from the cutter bar;

(b) a member fixedly attached to said frame located behind said crop-directing means;

(c) guide means slidingly mounted on and surrounding said member and adapted to revolve therearound in a selected direction;

(d) means for revolving said guide means about said member; and (e) said crop-directing means including a plurality of directing fingers each having a first section fixedly attached to a second section; said first section fixedly attached to the frame below the cutter bar and extending upwardly and forwardly therefrom; said second section extending upwardly and rearwardly from said first section and angled in a direction coinciding with the direction said guide means revolve about said member.

17. An apparatus for harvesting stalk-type crops comprising:

(a) a frame having a front portion;

(b) crop-directing means mounted on said frame and extending forwardly from said front portion;

(c) cutting means connected to said front portion;

(d) a member mounted on said frame behind said cutting means;

(e) guide means surrounding said member and adapted to revolve therearound;

(f) means for revolving said guide means about said member; and (g) said crop directing means including a plurality of directing fingers each having a first section fixedly attached to a second section; said first section fixedly attached to the frame below said cutting means and extending upwardly and forwardly therefrom; said second section extending and rearwardly from said first section and angled in a direction coinciding with the direction said guide means revolves about said member.

18. An apparatus for harvesting stalk-type crops comprising:

(a) a frame having a front portion and a base;

(b) a plurality of crop-directing fingers mounted on said base and extending forwardly from said front portion;

(c) a generally transversely disposed horizontal cutter bar slidingly connected to said front portion;

(d) first and second spaced members mounted on said frame behind said cutter bar; said first and second members each having a top and a bottom;

(e) a platform mounted on said frame and located between said first and second members;

(f) first and second guide means; said first guide means slidingly connected to and surrounding said first member and adapted to revolve therearound; said second guide means slidingly connected to and surrounding said member and adapted to revolve therearound;

(g) means for respectively revolving said first and second guide means about said first and second members; and (h) said first and second guide means each including:
(1) first and second parallel and generally horizontal guide supports fixedly attached to said first member and located near said top;
(2) a first guide chain surrounding said first member and slidingly mounted between said first and second guide supports and supported thereby;
(3) a plurality of spaced, first gathering lugs fixedly attached to said first chain and extending outwardly from said first member;
(4) third and fourth parallel and generally horizontal guide supports fixedly attached to sad first member and located near said bottom;
(5) a second guide chain surrounding said first member and slidingly mounted between said third and fourth guide supports and supported thereby; and
(6) a plurality of spaced second gathering lugs fixedly attached to said second chain and extending outwardly from said first member at a distance greater than said gathering lugs.

* * * * *